Dec. 11, 1923.
N. WILKINSON
COMMUTATOR COOLING APPARATUS
Filed April 28, 1921
1,476,940
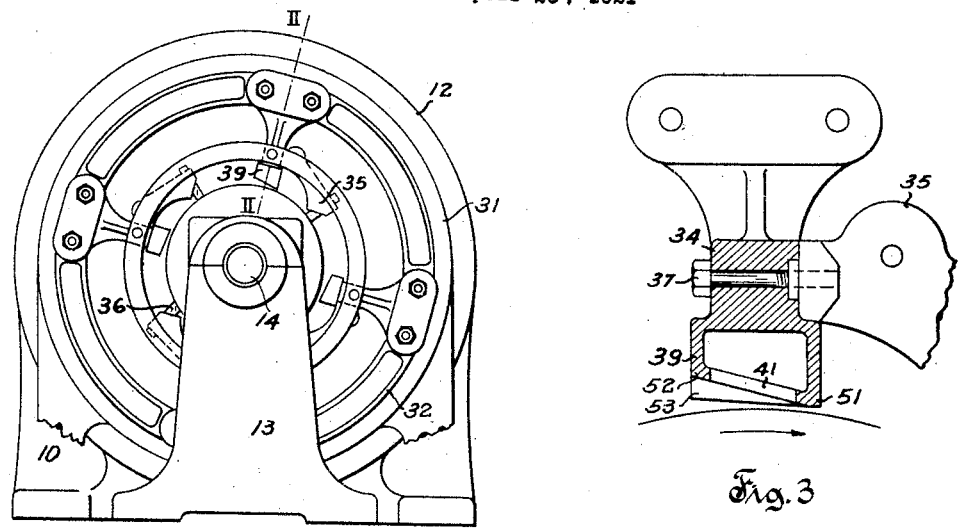
Fig. 1
Fig. 3
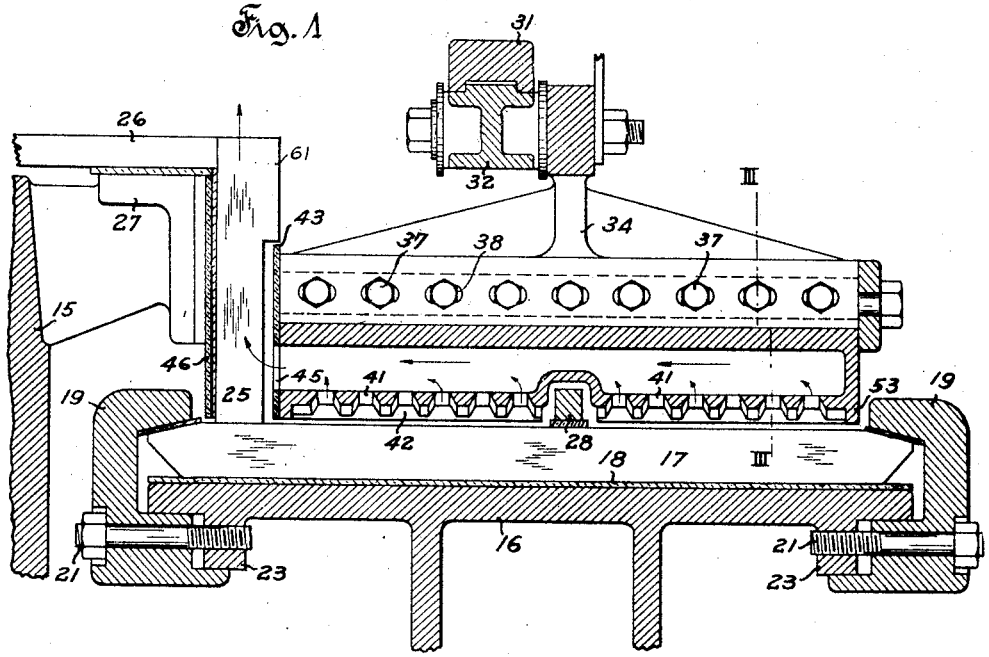
Fig. 2
Inventor
N. Wilkinson
by G. P. DeWein
Attorney Patented Dec. 11, 1923.

1,476,940

UNITED STATES PATENT OFFICE.

NATHAN WILKINSON, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

COMMUTATOR-COOLING APPARATUS.

Application filed April 28, 1921. Serial No. 465,269.

*To all whom it may concern:*

Be it known that NATHAN WILKINSON, a citizen of the United States, residing at Wauwatosa, in the county of Milwaukee and State of Wisconsin, has invented a certain new and useful Improvement in Commutator-Cooling Apparatus, of which the following is a specification.

This invention relates in general to dynamo-electric machines, and has particular relation to devices or apparatus for effecting the cooling of the current-collecting apparatus of machines of the direct current type.

The economical design of a dynamo-electric machine of the direct current type requires that there be suitable provision for permitting the commutator bars and necks to carry the greatest value of current without undue heating and the consequent losses and limiting of capacity. This is especially the case in connection with generators designed for electrolytic work wherein currents of relatively high density and low voltage are carried by the commutator bars and necks. Where machines are designed for the purpose of carrying extremely heavy currents, it has often been necessary to supply separate machines or a single machine provided with several commutators, the total current of the latter machine being divided among the several commutators. In fact, it will be readily apparent that where heavy currents are to be handled, efficient design and operation require that, in order to secure maximum current-carrying capacity of the brushes and commutator parts, the latter must be maintained relatively cool so as to reduce to a minimum the $I^2R$ losses and consequent heating and decrease in current-carrying capacity.

In accordance with the general features of this invention, auxiliary apparatus is associated with an ordinary dynamo-electric machine, the general combination being operative to cause the removal of heated air from points adjacent the surface of the commutator and the brushes engaging therewith, thus causing or permitting quantities of relatively cool air to come in contact continually with the surfaces of these parts of the machine.

It is an object of this invention to provide a construction of dynamo-electric machine embodying improved means for increasing the efficiency of the machine by removing heated air from the immediate vicinity of the current-collecting devices.

It is a further object of this invention to provide an improved construction of dynamo-electric machine, embodying devices associated with relatively fixed and movable parts of the machine and utilizing an element associated with a rotating part of the machine as a fan or blower to cause the removal of heated air from portions of the machine, to insure maintenance of these parts at a relatively low temperature.

It is a further object of this invention to provide an improved construction of dynamo-electric machine wherein means are provided for insuring cooling of the current-collecting devices, this cooling means embodying the utilization of brush-holder supports as conduits or carriers of the cooling system.

These and other objects and advantages are attained by the present invention, various novel features of which will appear from the description, disclosing an embodiment of the invention, and will be particularly pointed out in the claims.

In the accompanying drawings:

Figure 1 is an elevation of a dynamo-electric machine embodying features of the present invention.

Figure 2 is a radial section through the plane of the line II—II of Figure 1, with the parts enlarged.

Figure 3 is a vertical section in the plane of the line III—III of Figure 2.

In accordance with the illustrative disclosure of the drawings, a dynamo-electric machine 10 includes a stationary yoke or frame 12 and one or more pedestals 13 upon which a shaft 14, supporting the armature 15, is mounted. A spider or support 16 having a cylindrical outer surface is held in operative position at one end of the armature, being preferably mounted upon the shaft 15 so as to rotate therewith, and this support carries a series of commutator segments or bars 17, the latter being spaced from the support 16 by means of insulation, indicated at 18. The commutator segments or bars are held in operative position relative to the support 16 by means of V-shaped clamping rings 19 which overlap the segments adjacent their ends and serve to force and hold the segments in position as the bolts 21, co-acting with the clamping rings 19 and inwardly extending lugs 23 on the support 16, draw the clamping rings toward each other and hold them securely in operative position.

The commutator bars or segments are provided with leads or necks 25 connected to the end turns of the armature winding 26, these end turns being carried or held in position by the support 27 associated with the armature spider or core. The end turns of the winding are preferably spaced from the support 27 by insulating material, as indicated.

Due to the fact that, in machines of large current-carrying capacity, in connection with which type the present invention has its greatest utility, the commutator bars are necessarily long in order to provide for the collection of large currents without making the diameter of and consequently the peripheral speed of the commutator too great, it is usually necessary or desirable to provide one or more shrink rings, such as 28, at points intermediate the clamping rings 19, these rings serving to hold intermediate portions of the commutator bars in operative position relative to the support 16, and to withstand all distorting strains in a radial direction, such as might be occasioned by centrifugal force acting upon the commutator bars.

The dynamo-electric machine 10 is provided with a brush yoke 31 within which is mounted a brush-supporting ring 32, the supporting arrangement being such as to permit rotation of the ring within the yoke. A plurality of brush-supporting brackets 34 are mounted upon the ring 32, as by means of bolts at spaced points about the periphery of the commutator, these brush brackets being here indicated as four in number. Each of the brush brackets 34 carries a plurality of brush-holders 35, each of the latter serving as a mounting for a brush 36. The brush-holders are held in operative position relative to the brush brackets by means of securing bolts 37, one for each brush-holder. In order to provide for adjustment of individual brush-holders axially of the machine, the supporting bolts 37 are free to move to a limited extent within elongated slots 38 of the brush bracket. Through this provision, the brushes on the several brush brackets may be so staggered that no appreciable grooves or ridges will be formed on the commutator surface.

The brush brackets 34 are provided with substantially radial extensions 39, each of which has a longitudinal passage or conduit, indicated at 41, and has spaced apertures 42 at its radially inner side for providing communication between the exterior of the part 39 and its internal conduit 41. These apertures 42 are preferably bell-shaped, as indicated, with the widened mouths of the apertures adjacent the commutator surface. The passage or conduit 41 is open at its inner end, that is, adjacent the armature core, and closed at its opposite end. A barrier 43 in the form of an annular plate, preferably of insulating material, is mounted upon the inner sides of the brush brackets 34, in close proximity to the commutator necks 25, and extends radially inward to a point immediately adjacent the commutator surface. This barrier 43 is provided with apertures 45 in alinement with the conduits or passages 41 in the extensions 39 of the brush brackets 34.

A second barrier 46 in the form of an annular plate is mounted in position, being preferably attached to the coil support 27, at a point inside the commutator necks 25, being preferably immediately adjacent the latter and extending to a point in close proximity to the commutator surface.

Under conditions of normal operation, the passage of current through the commutator bars and the brushes develops heat at these points. Bodies of air which have become heated through contact with the surface of the commutator and the brushes have a tendency to cling fairly closely to the commutator surface, being dragged around by the rotating parts. Cooling of the current-collecting devices is accomplished by removing this heated air from the immediate vicinity of these parts, thus permitting relatively cool air to pass over and come into contact with the heated parts, thus providing a continuous circulation of air over the current-collecting parts and maintaining the same at a relatively low temperature.

In the particular embodiment of the invention disclosed, the commutator necks 25, independently of whether they are plain or skewed, exercise a fan action during the rotation of the armature, and draw the heated air from the commutator surface and force this air radially outward. The barriers 43 and 46 in co-operative proximity to opposite axial sides of the commutator necks or leads 25 form a casing for the leads, thus permitting the latter to exercise a fan or blower action and draw air from the passage or conduit 41 in the brush arm 34, the heated air being sucked from the commutator surface through the apertures 42 and the passage 41 of the part 39, and through the openings 45, to the space between the barriers 43 and 46 whence it is forced out radially by the necks 25. It will be apparent that this removal of heated air from the commutator surface is continuous during the operation of the machine, relatively cool air continually replacing the air which becomes heated adjacent the commutator surface and the brushes. Making the apertures 42 bell-shaped in cross-section, as shown, facilitates the passage of heated air through these apertures and the conduit 41. Instead of a plurality of spaced apertures 42, a single longitudinally extending and relatively narrow aperture might be provided.

In order to facilitate the removal of this heated air from the commutator surface, the trailing edge of the extension 39 of the brush-supporting arm is relatively close to the commutator surface, as indicated at 51, while the forward edge is removed to a considerable degree, as indicated at 52, the end portions of the extension projecting to points fairly close to the commutator surface, as indicated at 53. A pocket is thus formed for the heated air dragged around by the commutator, preventing substantial movement of this air along with the commutator beyond the trailing edge 51, thus insuring that the greater portion of this heated air passes through the apertures 42, the conduit 41, and the fan formed by the commutator necks.

The cross-sectional shape of the conduit 41 may be as indicated in Figures 2 and 3, or it may be of tapered cross-section with its smaller end at the axially outer side and enlarging gradually as it approaches the inner end. The main provision in so far as this conduit is concerned, is that the latter shall be of sufficient size to remove all the heated air that can be drawn through the apertures 42 and forced out by the fan action of the commutator necks 25.

Due to the fact that the portions of the commutator bars adjacent the leads or necks 25 carry heavier currents than the portions remote from the leads, it may be desirable to make the apertures 42 adjacent the leads of greater size or number in order to permit passage of a greater quantity of air across these portions of the commutator bars.

The space between the axially outer sides of the commutator necks and the barrier 43 should be such as to readily permit the required degree of end play of the armature of the machine. As a means for assisting in or facilitating the removal of heated air from the conduit 41, the commutator necks may have axial extensions 61 overlying at all times the space between the barrier 43 and the adjacent portions of the commutator necks. As a further modification, instead of the extensions 61 on the commutator necks, an annular barrier may be secured in position radially overlying the barrier 43 at all times during operation of the machine, thus causing the air to travel outward between, rather than outside, the commutator necks. This annular barrier may be held in position by securing the same to the support 27 for the end turns of the armature winding.

While maximum desirable results may be attained in the structure described, where-in the fan action is secured by means of the commutator necks 25, nevertheless, certain desirable results may be secured in a structure wherein a similar action is secured by an independent fan mounted upon a rotating part of the machine, either at the inner or outer end of the commutator, and independently of whether the fan be mounted on the shaft or spider or upon the end clamping rings 19.

It will be apparent that the present invention permits utilizing a machine having a single commutator of maximum length, without undue initial cost and with satisfactory efficiency in operation.

It should be understood that the invention claimed is not limited to the exact details of construction shown and described, for obvious modifications will occur to a person skilled in the art.

It is claimed and desired to secure by Letters Patent:

1. In a dynamo-electric machine provided with a rotatable current-collecting element, a conduit having an inlet adjacent an active face of said current-collecting element, said conduit and its axis being located externally of said element, and fluid-circulating means operative to cause the withdrawal of fluid directly from the active surface of said current-collecting element and the passage of said fluid through said conduit means.

2. In a dynamo-electric machine provided with a rotatable current-collecting element, a plurality of circumferentially spaced conduits located outside of said current-collecting element and having inlets adjacent the active face of said element, and fluid-circulating means having an element rotatable with the rotatable element of said machine and operative to cause the passage of heated fluid from the active face of said current-collecting element and through said conduits.

3. In a dynamo-electric machine provided with a rotatable current-collecting element, a conduit disposed and having its axis located externally of said rotatable current-collecting element, and fluid-circulating means having its rotatable element mounted axially of and at one end of said rotatable current-collecting element and operative to cause the withdrawal of heated fluid from the active surface of said current-collecting element and the removal of said fluid through said conduit means.

4. In a dynamo-electric machine provided with a commutator and leads connecting said commutator to an armature winding, a plurality of circumferentially spaced conduits located externally of said commutator and having inlets adjacent the surface of said commutator, the discharge ends of said conduits being located adjacent the leads of said commutator, and said leads being effective during operation of said machine to circulate air through said conduit means and across the surface of said commutator.

5. In a dynamo-electric machine provided with a commutator and leads connecting said commutator to the armature winding of said machine, conduit means having an inlet adjacent said commutator and a discharge located adjacent the leads of said commutator, and barriers located at opposite axial sides of said leads to act as an enclosing casing therefor, said leads being effective to act as a fan for drawing air from points adjacent the surface of said commutator and through said conduit means.

6. In a dynamo-electric machine provided with a commutator and leads connecting said commutator to an armature winding, air-circulating means having its rotatable element mounted axially of and at the axially inner end of said commutator, stationary conduit means having an inlet adjacent said commutator, a barrier located at the axially outer side of said air-circulating means and apertured in line with the discharge end of said conduit means.

7. In a dynamo-electric machine provided with a rotor having a commutator and leads connecting said commutator to an armature winding, conduit means having an inlet adjacent the surface of said commutator, the discharge end of said conduit means being located adjacent the commutator leads whereby said leads are effective to cause circulation of air through said conduit during operation of said machine, a barrier rotatable with and located at the axially inner side of said commutator leads, and a stationary barrier at the axially outer side of and adjacent said leads, said stationary barrier being apertured in line with the discharge end of said conduit means.

8. In a dynamo-electric machine, current-collecting apparatus comprising a part rotatable with the armature of said machine, and brush-supporting mechanism mounted in operative position and comprising a plurality of brush-supporting arms, said arms having hollow portions forming conduits open at the ends adjacent the axially inner end of the rotatable part of said current-collecting apparatus and provided with inlets adjacent the outer surface of said rotatable part, and air-circulating means comprising a fan element rotatable with the rotatable element of said current-collecting apparatus.

9. In a dynamo-electric machine, current-collecting apparatus comprising a part rotatable with the armature of said machine, and brush-supporting mechanism mounted in operative position and comprising a plurality of brush-supporting arms having hollow portions forming conduits provided with discharge openings at one end and inlets at points adjacent the outer surface of said rotatable part of said current-collecting apparatus, and air-circulating means operable with the armature of said machine and effective to draw air from said current-collecting apparatus and through said conduit-forming portions.

10. In a dynamo-electric machine, a commutator, and leads connecting the segments thereof to an armature winding, and brush-supporting mechanism mounted in operative position adjacent said commutator and comprising a plurality of brush-supporting arms, said arms having hollow portions extending longitudinally of the commutator and forming conduits open at the ends adjacent the axially inner end of the commutator and provided with inlets at points adjacent said commutator, said leads acting as a means for circulating air from the commutator surface through said conduit and said leads.

11. In a dynamo-electric machine, a commutator, and leads connecting the segments thereof to an armature winding, brush-supporting mechanism mounted in operative position adjacent said commutator and comprising a plurality of brush-supporting arms having hollow portions extending longitudinally of the commutator and forming conduits open at the ends adjacent the axially inner end of the commutator and provided with inlets at points adjacent said commutator, a barrier held in operative position against the inner ends of said conduit-forming portions and extending radially inward into close proximity to said commutator and provided with apertures in alinement with those of said conduit-forming portions, said leads being effective to draw air from the surface of said commutator through said conduit-forming portions.

12. In a dynamo-electric machine, a commutator, and leads connecting the segments of the commutator to the armature winding of said machine, brush-supporting mechanism mounted in operative position adjacent said commutator and comprising a plurality of brush-supporting arms, said arms having portions extending longitudinally of said commutator and being formed as conduits open at their ends adjacent the inner end of said commutator and provided with inlets at points adjacent the surface of said commutator, a barrier disposed within and adjacent said leads and extending radially inward to a point immediately adjacent said commutator and rotatable therewith, and a barrier held in operative position against the axially inner ends of the conduit-forming portions of said brush arms and extending radially inward into close proximity to the commutator surface, said latter barrier being provided with apertures in alinement with those of said conduit-forming portions, and said leads being operative to draw air from the commutator surface through said conduit forming portions.

13. In a dynamo-electric machine, current-collecting apparatus comprising a part rotatable with the armature of said machine, stationary conduit-forming means having an inlet portion located outside of and adjacent a rotatable part of said current-collecting apparatus and having its trailing edge positioned nearer the surface of said rotatable part than the leading edge thereof, and air-circulating means comprising an element mounted axially of and rotatable with said rotatable current-collecting part and effective to draw air from the surface of said latter part through said conduit-forming means.

14. In a dynamo-electric machine provided with a rotatable commutator, leads connecting said commutator to the armature winding of said machine, and barriers located at opposite axial sides of said leads and adapted to act as an inclosing housing therefor, the axially outer barrier providing an aperture adjacent the surface of said commutator, and said leads being effective to act as a fan for drawing air from points adjacent the surface of said commutator and through the aperture provided by said outer barrier.

15. In a dynamo-electric machine provided with a rotatable commutator, leads connecting said commutator to the armature winding of said machine, and barriers located at opposite axial sides of said leads and adapted to act as an inclosing housing therefor, the axially outer barrier being supported in relatively fixed position and providing an aperture adjacent the surface of said commutator, the axially inner barrier being carried by said armature, and said leads being effective to act as a fan for drawing air from points adjacent the surface of said commutator and through the aperture provided by said outer barrier.

16. In a dynamo-electric machine having a rotatable armature provided with a commutator, means adjacent the axially inner end of said commutator for producing a fan action during the operation of the machine, and barriers located at opposite axial sides of said fan means and adapted to act as a housing therefor, the axially outer barrier providing an aperture adjacent the surface of said commutator, and said fan means being effective to draw air across the outer surface of said commutator and through the aperture provided by said outer barrier.

17. In a dynamo-electric machine having a rotatable armature provided with a commutator, devices associated with said commutator for producing a fan action during the operation of said machine, and barriers located at opposite axial sides of said fan means and adapted to act as a housing therefor, at least one of said barriers providing an aperture adjacent the surface of said commutator, and said fan means being effective to draw air from a point adjacent the outer surface of said commutator and through the aperture provided by said barrier.

In testimony whereof, the signature of the inventor is affixed hereto.

NATHAN WILKINSON.